United States Patent [19]
Valle et al.

[11] Patent Number: 5,203,629
[45] Date of Patent: Apr. 20, 1993

[54] METHOD FOR MODIFYING CONCRETE PROPERTIES

[75] Inventors: Stephen A. Valle, Bradford; John E. Sorenson, North Reading, both of Mass.; Robert C. Hegger, Oak Park; Walter W. Wydra, Itasca, both of Ill.

[73] Assignee: W.R. Grace & Co.-Conn., New York, N.Y.

[21] Appl. No.: 683,214

[22] Filed: Apr. 10, 1991

Related U.S. Application Data

[63] Continuation-in-part of Ser. No. 563,580, Aug. 7, 1990.

[51] Int. Cl.$^5$ .............................................. B01F 17/00
[52] U.S. Cl. ...................................... 366/2; 366/349; 206/524.1
[58] Field of Search ............... 366/2, 6, 19, 150, 342, 366/76; 206/524.1, 524.7, 524.6, 212, 216, 527; 222/87

[56] References Cited

U.S. PATENT DOCUMENTS

| | | | |
|---|---|---|---|
| 931,350 | 8/1909 | Thoma | 206/524.7 |
| 1,916,531 | 7/1933 | Robb | 366/150 |
| 3,056,491 | 10/1962 | Campbell | 206/524.1 |
| 3,431,166 | 5/1969 | Muzutani . | |
| 3,859,125 | 1/1975 | Miller et al. . | |
| 3,863,758 | 2/1975 | Connelly | 206/524.1 |
| 3,902,596 | 9/1975 | McVay | 206/524.7 |
| 4,210,009 | 7/1980 | Farfor . | |
| 4,344,266 | 8/1982 | Gray . | |
| 4,426,458 | 1/1984 | Woodhams . | |
| 4,518,725 | 5/1985 | Guicquero . | |
| 4,555,354 | 11/1985 | Clarke et al. . | |
| 4,657,593 | 4/1987 | Aignesberger et al. . | |
| 4,665,109 | 5/1987 | Pedersen et al. . | |
| 4,814,014 | 3/1989 | Arfaei . | |
| 4,961,790 | 10/1990 | Smith et al. . | |

FOREIGN PATENT DOCUMENTS

| | | | |
|---|---|---|---|
| 2342060 | 9/1977 | France | 206/524.1 |
| 63-281975 | 11/1988 | Japan | 206/524.6 |

OTHER PUBLICATIONS

C1116-89, "Standard Specification for Fiber-Reinforced Concrete and Shotcrete:", vol. 04.02, pp. 571-578 (1990).
Grant, *Grant & Hackh's Chemical Dictionary*, 5th ed., p. 338 (1987).
Kirk-Othmer, *Encyclopedia of Chemical Technology*, 3rd ed., vol. 16, p. 801 (1981).
W.R. Grace & Co.-Conn., Technical Data Sheet entitled: "Grace-Fibers TM —Fiber Reinforcement for Concrete" 1989.
"Fine Particle Size Vermiculite", W.R. Grace & Co.--Conn., Oct. 1990.

*Primary Examiner*—Frankie L. Stinson
*Attorney, Agent, or Firm*—Craig K. Leon; William L. Baker

[57] ABSTRACT

The present invention relates to a method for modifying the properties of a concrete by introducing a solid admixture, contained in a paper package, into a fresh concrete, said solid admixture being selected from the group consisting of air-entraining admixtures, air detrainer admixture, accelerating admixture, alkali-reactivity reducer, superplasticizer, pumping aids, water-reducing admixture, corrosion inhibitor, permeability reducer, fibers, and mixtures thereof; and mixing the fresh concrete in a batch type mixer for sufficient time to cause the packaging material to disintegrate and distribute the admixture relatively uniformly throughout the fresh concrete.

11 Claims, No Drawings

METHOD FOR MODIFYING CONCRETE PROPERTIES

This application is a continuation-in-part of application Ser. No. 563,580 filed on Aug. 7, 1990 still pending.

TECHNICAL FIELD

This invention relates to an improvement in the field of concrete additives useful in modifying the properties of concrete. This invention also relates to a concrete-ready bag containing concrete admixture which is added directly to a concrete mixer, or similar apparatus, during a concrete mixing operation. Specifically, the present invention relates to a method for modifying the properties of a concrete by introducing a pre-weighted amount of powdered or solid concrete admixture within a container into a wet mixer and thereafter agitating the resulting mix until the container disintegrates and the admixture is dispersed.

BACKGROUND OF THE INVENTION

As known in the art, an admixture is a material other than hydraulic cement, water, and aggregates that is used as an ingredient of concrete or mortar and is added to the batch immediately before or during its mixing. Admixtures are used to modify the properties of the concrete in such a way as to make it more suitable for a particular purpose or for economy. Thus, the major reasons for using admixtures are (1) to achieve certain structural improvements in the resulting cured concrete; (2) to improve the quality of concrete through the successive stages of mixing, transporting, placing, and curing during adverse weather or traffic conditions; (3) to overcome certain emergencies during concreting operations; and (4) to reduce the cost of concrete construction. In some instances, the desired result can only be achieved by the use of an admixture. In addition, using an admixture allows the employment of less expensive construction methods or designs and thereby offsets the costs of the admixture.

For example, at the end of a delivery, concrete mixers may contain from 200 to 600 pounds or residual cement, sand or rock when left in the mixer overnight, the residual concrete will settle and harden in the bottom of the mixer. While the residual materials can be washed out of the mixer with a large amount of water, disposal of the liquid may cause an environmental problem particularly in large metropolitan areas. To avoid this problem, it is desirable to delay or retard the setting of residual concrete in a mixer so that it remains fluid and the residual material can still be used the next day. It is also desirable to be able to delay or retard the setting of concrete in a mobile mixer while the mixer is being transported to another location. For specific applications, it may also be desirable to retard or delay the setting of concrete for a specific length of time curing breakdown or delay in traffic in pupulated areas. The addition of retarding admixture to the concrete is used to solve each of these problems. By varying the amounts of a retarding admixture used in a batch, the setting of the concrete can be delayed for a selected time period. The availability of a pre-weighed or pre-measured quantity of retarding admixture can increase the accuracy with which the setting time can be delayed.

Admixtures are commercially available as water-soluble solids or powders, requiring job mixing at the point of usage, or a ready-to-use liquids added at bulk blending stations. The successful use of admixtures depends upon the accuracy with which they are prepared and batched. Batching means the weighing or volumetric measuring of the ingredients for a batch of either concrete or mortar and introducing them into the mixer. The amount of admixture added during batching must be carefully controlled. Inaccuracies in the amount of admixture added can significantly affect the properties and performance of the concrete being batched and even defeat the original purpose of including the admixture. The need for accuracy in measuring the amount of solid admixture to be added to a batch is particularly acute where only a relatively small amount of admixture is acquired for the job.

Solid powdered admixtures are packaged and sold in bags, boxes and drums, and the admixture is added to the concrete mixture by opening the package and shoveling or dumping the admixture directly into a concrete mixer, or similar apparatus, during the concrete mixing operation. This labor intensive task is often messy and can also result in a non-uniform dispersion of admixture. Accordingly, it is desirable to have a method of dispersing admixture which is less labor intensive, less messy and more effective at uniformly distributing the admixture throughout the mixture.

It is an objective of the present invention to provide a method for providing a pre-measured amount of cement admixture to a concrete wet mixer which is less labor intensive than conventional methods.

It is also an objective of the present invention to provide a method for uniformly distributing admixture throughout fresh concrete.

These and other objectives will be made apparent from the following:

SUMMARY OF THE INVENTION

The present invention relates to a method for modifying the properties of a concrete by introducing a solid admixture, contained in a paper package, into a fresh concrete, said solid admixture being selected from the group consisting of air-entraining admixtures, air detrainer admixture, accelerating admixture, alkali-reactivity reducer, superplasticizer, pumping aids, water-reducing admixture, corrosion inhibitor, permeability reducer, fibers, and mixtures thereof; and mixing the fresh concrete in a batch type mixer for sufficient time to cause the packaging material to disintegrate and distribute the admixture relatively uniformly throughout the fresh concrete.

The present invention also elates to a method for providing a relatively uniform distribution of admixture throughout a fresh concrete comprised of placing one or more closed packages containing a cumulatively effective amount of said admixture directly into said fresh concrete under sufficient agitation so as to cause the packaging material to disintegrate and dispense said fibers.

DETAILED DESCRIPTION OF THE INVENTION

As used herein, the term "effective amount" of admixtures means an adequate quantity of material per cubic meter of hardened concrete to impart the desired improvement in the wet/dry concrete. Often, more than one bag of admixture material is added to a commercial concrete mixer. As a result, the total amount of admixture from the bags must "cumulatively" results in an effective amount. Typically, one bag containing from about 0.10 lb. to about 100.0 lb. of admixture is added to each cubic meters of concrete (dry weight).

As used herein, the term "uniform distribution" or "relatively uniform distribution" means that the admixture is distributed in such a manner as that the desired property, i.e. air entrainment, retardation, acceleration, etc., can be observed (preferably measured) in samples taken from the beginning, middle and end of the concrete mixture.

As used herein the term "batch type concrete mixer" means any batch mixer suitable for thoroughly mixing cement and aggregates so as to obtain a homogeneous mass and coat all particles with cement paste. Preferred concrete mixers are: (1) rotating mixers, consisting of a revolving drum or a square box revolving about its diagonal axis and usually provided with deflectors and blades to improve the mixing; or (2) paddle mixers, consisting of a stationary box with movable paddles which perform the mixing. Rotating mixers are most preferred for use in the present invention.

Many manufacturers have developed water soluble papers. For example, Gilbreth Company, Philadelphia, Penna., markets "Dissolve", which is a water soluble paper prepared by coating synthetic paper with polyvinyl alcohol. The resoluble papers comprise carboxy methyl cellulose and the sodium or potassium salt of carboxy methyl cellulose. (See Miller, et al. U.S. Pat. No. 3,859,125 issued Jan. 7, 1975) These specialized papers would surely dissolve in the aqueous environment of a concrete mixing operation. However, these papers are very expensive and, it is believed that these papers would dissolve too rapidly and could produce a large clump of admixture within the mix which might resist distribution. Furthermore, the alcohol coatings of the soluble paper may have a detrimental effect on the resulting concrete as they tend to detrain air in the wet mix.

The method of the present invention allows a powdered solid admixture to be added or dispensed into a wet mixer expediently, economically and accurately.

Some admixtures are used to modify the fluid properties of fresh concrete, mortar and grout, while others are used to modify hardened concrete, mortar, and grout. The various admixtures used in the present invention are materials that can be used in concrete mortar or grout for the following purposes: (1) to increase workability without increasing water content or to decrease the water contents at the same workability: (2) to retard or accelerate the time of initial setting; (3) to reduce or prevent settlement of the finished material or to create slight expansion thereof; (4) to modify the rate and/or capacity for bleeding; (5) to reduce segregation of constituent ingredients; (6) to improve penetration and pumpability; (7) to reduce the rate of slump loss; (8) to retard or reduce heat evolution during early hardening; (9) to accelerate the rate of strength development at early stages; (10) to increase the strength of the finished material (compressive, tensile, or flexural); (11) to increase durability or resistance to severe conditions of atmospheric exposure, including application of deicing salts; (12) to decrease the capillary flow of water within the material; (13) to decrease permeability of the material to liquids; (14) to control expansion caused by the reaction of alkaliea with certain aggregate constituents; (15) to produce cellular concrete; (16) to increase the bond of concrete to steel reinforcing elements; (17) to increase bond between old and new concrete; (18) to improve the impact resistance and abrasion resistance of finished materials; (19) to inhibit the corrosion of embedded metal; (20) to produce colored concrete or mortar; and (21) to introduce natural or synthetic fibers to reinforce concrete.

Concrete admixtures are classified by function as follows: Accelerators are used to accelerate the setting and early strength development of concrete. Some of the common materials that can be used to achieve this function are calcium chloride, triethanolamine, sodium thiocyanate, calcium formate, calcium nitrite, and calcium nitrate.

Retarding, or delayed-setting, admixtures are used to retard, delay, or slow the rate of setting of concrete. Retarders are used to offset the accelerating effect of hot weather on the setting of concrete, or delay the initial set of concrete or grout when difficult conditions of placement occur, or problems of delivery to the job site, or to allow time for special finishing processes. Most retarders also act as water reducers and can also be used to entrain some air into concrete. Lignosulfonates, hydroxylated carboxylic acids, lignin, borax, gluconic, tartaric and other organic acids and their corresponding salts, and certain carbohydrates can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents' salts of sulfonated lignin' salts of petroleum acids' salts of proteinaceous material' fatty and resinous acids and their salts' alkylbenzene sulfanates' and salts of sulfonated hydrocarbons.

Alkali-reactivity reducers can reduce alkali-aggregate expansion of these reducers, pozzolans (fly ash, silica fume), blast-furnace slag, salts of lithium and barium, and other air-entraining agents are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ration of water and cement, or to increase slump. Typically, water reducers will reduce the water content of the concrete mixture by approximately 5% to 10%.

Superplasticizers are high-range water reducers, or water-reducing admixtures. They are added to concrete to make high-slump flowing concrete, thus reduce the water-cement ratio. These admixtures produce large water reduction or great flowability without causing undue set retardation or entrainment of air in mortar or concrete. Among the materials that can be used as superplasticizers are sulfonated malamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures are usually composed of pigments and include carbon black, iron oxide, phthalocyane, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphate; or fluoaluminites, and fluosilicates.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust group properties to achieve a desired result for specific applications. For example, portland cement groups are used for a variety of different purposes, each of which may require a different agent to stabilize foundations, set machine bases, fill cracks and joints in concrete work, cement oil wells, fill cores of masonry walls, grout aggregate concrete.

Gas formers, or gas-forming agents, are sometimes added to concrete and grout in very small quantities to cause a slight expansion prior to hardening. The amount of expansion is dependent upon the amount of gas-forming material used, the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans water reducers, and latex can be employed to decrease the permeability of the concrete. Pozzolan is a siliceous or siliceous and aluminous material, which in itself possesses little or not cementitious value. However, in finely divided form and in the presence of moisture, Pozzolan will chemically react with calcium hydroxide at ordinary temperatures to form compounds possessing cementitious properties.

Pumping aids are added to concrete mixed to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dieldrin emulsions, and copper compounds.

Fresh concrete can sometimes be harsh because of faulty mixture proportions or certain aggregate characteristics such as particle shape and improper grader. Under these conditions, entrained air which acts like a lubricant, can be used as a workability improving agent. Other workability agents are water reducers and certain finely divided admixtures.

Finely divided mineral admixtures are materials in powder of pulverized form added to concrete before or during the mixing process to improve or change some of the plastic or hardened properties of portland cement concrete. Portland cement, as used in the trade, means hydraulic calcium silicates, all usually containing one or more of the forms of calcium sulfate as an interground addition with ASTM types, I, II, III, IV, or V. The finely divided mineral admixtures can be classified according to their chemical or physical properties as" cementitious materials pozzolans' pozzonaic and cementitious materials; and nominally invert materials. Cementitious materials are materials that alone have hydraulic cementing properties, and set and harden in the presence of water. Included in cementitious materials are ground granulated blast-furnace slag natural cement, hydraulic hydrated lime, and combinations of these and other materials. As discussed above, pozzolan is a siliceous or aluminosiliceous material that possesses little or not cementitious value but will, in the presence of water and in finely divided form, chemically react with the calcium hydroxide released by the hydration of portland cement to form materials with cementitious properties. Diatomaceious earth, opaline cherts, clays, shales, fly ash, silica fume, volcanic tuffs and pumicites are some of the known pozzolans. Certain ground granulated blast-furnace slags and high calcium fly ashes posses both pozzolanic and cementitious properties. Nominally inert materials can also include finely divided raw quartz, dolomites, limestones, marble, granite, and others. Synthetic or natural fibers are nylon, polypropylene, zirconium materials, and various kinds of fiber glasses.

In the construction field, many methods of strengthening concrete have been developed through the years. One modern method involves distributing fibers throughout a fresh concrete mixture. Upon hardening, this concrete is referred to as fiber-reinforced concrete. Fibers can be made of steel, glass, or synthetic materials, e.g., polypropylene, nylon, polyethylene, polyester, rayon, high-strength aramid, (i.e. Kevlar®), or mixtures thereof. Preferred fibers of the present invention are synthetic fibers. Preferred synthetic fibers, according to the present invention, are manufactured from 100% virgin polypropylene in collated, fibrillated form. Preferred fibers are about ½ to about ¾ inch in length. Fibers, in general, are further discussed in ASTM designation C116, "Standard Specification for Fiber-Reinforced Concrete and Shotcrete", incorporated herein by reference.

Mixtures of two or more admixtures are also contemplated by the present invention.

As discussed above, polymer of lignosulfonates are widely used raw materials in the production of water reducing admixtures. They are also used to retard or delay the setting of concrete. The lignosulfonates may have an average molecular weight of approximately 3,000 to 5,000 with the molecular weight distribution ranging from a few hundred to 100,000. The molecule is a polymer of substituted phenyl propane unit with hydroxyl (OH), methocy (OCH$_3$), phenyl ring (C$_6$H$_6$), and sulfonic acid (SO$_3$H) groups. Lignosulfonate is obtained as a waste liquor during the production of paper-making pulp from wood whose compositions may include from about 20% to about 30% of lignin. Lignosulfonate contains a complex mixture of sulfonation products of lignin, decomposition products of cellulose and lignin, various carbohydrates and free sulfurous acid and sulfates. Lignosulfonates are also available commercially as their sodium or calcium salts.

It has been discovered that a packaged material prepared from paper of a non-soluble, traditional variety abrades more slowly and, surprisingly, distributes the admixture very uniformly throughout the fresh concrete mixture. These non-soluble papers tend to disintegrate upon the wet abrasion found in the concrete mixer, they do not dissolve, because the cellulosic materials found within the paper are in soluble in water. The abrasion of the sand, gravel and other concrete components causes the paper to disintegrate, i.e. fragment into pieces which are unnoticeable to the human eye and have no detrimental effect on the properties of the finished concrete. Preferred papers contemplated in the present invention include repulpable and beater paper, shopping bag and kraft paper, and multiwall kraft paper. The most preferred papers are repulpable, beater papers. Flexible paper container material are further described in Kirk-Othmer. *Encyclopedia of Chemical Technology,* 3rd ed. (1981), vol. 16, page 801, incorporated herein by reference.

One paper which is particularly effective in the present invention is a 50 lb. white beater paper. This paper is fabricated from 100% pine pulp, has a basis weight of about 50 lb., a machine direction tear of about 109, a machine direction tensile of about 16, sizing of about 0, a brightness (TAPPI) of about 80.0, and a moistron moisture of about 5.6%. These paper specification determinations are further described in Kirk-Othmer, *Encyclopedia of Chemical Technology,* 3rd ed., (1981), Vol. 1b, pp. 771-780, incorporated herein by reference. This paper can be fabricated into a bag or pouch. Union Camp Corporation, Wayne, N.J., fabricates a 50 lb. white multi-wall beater paper bag which is most preferred in the present invention.

Bags or pouches can be fabricated in any shape, provided that they fit into the fill opening of a standard concrete mixture. A preferred embodiment of the present invention includes 1.5 lb. of admixture contained in a 15"×14" flat pillow pouch fabricated from the 50 lb. white multiwall beater paper bag described above.

The bag or pouch is typically placed inside the concrete mixer drum via the drum opening. This may be done before introducing the other concrete components, during the introduction of the concrete components, after the introduction of the concrete components, or any combination of the three. Mixing times should be at least about 5 minutes.

We have discovered that it is also helpful to seal bags of the present invention with a water soluble adhesive. These adhesives can be any water soluble or water miscible adhesive which imparts sufficient bond strength to prevent premature opening of the bag in transit. It is also important that the adhesive does not impart any deliterious qualities to the resulting concrete. A typical water soluble adhesive suitable for use in the present invention is a one-part acrylic copolymer emulsion adhesive.

It has also been discovered that distribution of most admixture can be improved by including a dispersant in the package along with the admixture. These dispersants can be water-reducing and high-range water-reducing dispersants selected from the group consisting of lignosulfonates (e.g., sodium lignosulfonate), naphthlene sulfonate, malemine sulfonate, "superplasticizers" (like those described in Arfaei U.S. Pat. No. 4,518,725 on Mar. 21, 1989; Aignesberger et al. U.S. Pat. No. 4,657,593 on Apr. 4, 1987; and Guicquero U.S. Pat. No. 4,814,014 on May 21, 1985, incorporated herein by reference), and mixtures thereof. Preferred dispersants are lignosulfonate and naphthlene sulfonate. Liquid dispersants are added to the admixture by spraying or any other acceptable coating means. Dry dispersants, in powder form, may be added directly to the bag containing the admixture. The ratio of dispersant to admixture is typically from about 1:1 to about 1:15 w/w. The preferred ratio of dispersant of admixture is from about 1:6 to about 1:9 w/w. The level of dispersant can vary based on the dispersant itself.

Although certain specific embodiments of the invention have been shown and described for use in the present invention, it will be apparent in accordance with the broader aspect of the invention that various modifications and other embodiments are possible. For example, preferred papers with slightly different characteristics may also work, or concrete mix, cement, sand and mixtures thereof may also be added to, or totally replace, the admixture. It is to be understood, therefore, that the invention is not limited to the specific arrangements shown, but in its broadest aspect, it includes all equivalent embodiments and modifications which come within the scope of the invention.

The following examples depict typical embodiments of the present invention:

EXAMPLE I

Method of Producing a Fiber-Containing Product

A quantity of 1.5 lb. of collated, fibrillated polypropylene fibers which are ¼" in length are weighed. The fibers are distributed by W. R. Grace & Co.-Conn., Cambridge, Mass. under the name GRACE FIBERS ™. These fibers have the following typical properties:

| | |
|---|---|
| Specific Gravity | 0.91 |
| Absorption | None |
| Modulus of Elasticity | 500 ksi |
| Melt Point | 160° C. |
| Ignition Point | 590° C. |
| Alkali, Acid + Salt Resistance | High |

The fibers are manually packaged in a 14"×15" 50 lb. white multi-wall beater paper flat, pillow-type bag, manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE II

Method of Producing a Silica Fume-Containing Product

A quantity of 9 lbs. of silica fume, which is in raw powder of a dry densified form, is weighted. The silica fume is distributed under the brand FORGE 10,000 ® by W. R. Grace & Co.-Conn., Cambridge, Mass.

The silica fume is manually packaged in a 30"×30" 50 lb. white multi-wall beater paper flat, pillow-type bag, of the type manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE III

Method of Producing a Calcium Chloride Containing Product

Calcium chloride ($CaCl_2$) is added to wet concrete to attain early strength gain and to insure proper setting characteristics during cold weather. A quantity of 1.5 lb. of Calcium Chloride manufactured by Dow Chemical, Midland, Mich. is weighed.

The calcium chloride is manually packaged in a 14"×15" 50 lb. white multi-wall beater paper flat, pillow-type bag, manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE IV

Method of Producing a Set Retarder Containing Product

Sodium gluconate is added as a retarder of the initial set of plastic concrete so that the concrete remains plastic until a time that it is needed. A quantity of 1.5 lbs. of a sodium gluconate product, manufactured under the brand RECOVER ® by W. R. Grace & Co.-Conn., Cambridge, Mass., is weighed.

The sodium gluconate is manually packaged in a 14"×15" 50 lb. white multi-wall beater paper flat, pillow-type bag, manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE V

Method of Producing a Pumping-Aid-Containing Product

Polyethylene oxide is added to plastic concrete to improve the mixability and/or pumpability of the concrete. A quantity of 1 lbs. of polyethylene oxide, manufactured by Union Carbide under the tradename "Polyox WSRN-80", is weighed.

The polyethylene oxide is manually packaged in a 14"×15" 50 lb. white multi-wall beater paper flat, pillow-type bag, manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE VI

Method of Producing an Accelerant Containing Product

Dry calcium nitrate is added to plastic concrete to accelerate hydration. It is also added to inhibit the corrosion of steel and restressed strands. A quantity of 10 lbs. of dry calcium nitrate is weighed. The dry calcium nitrate is manually packaged in a 30"×30" 50 lb. white multi-wall beater paper flat, pillow-type bag, of the type manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE VII

Method of Producing a Superplasticizer Containing Product

Superplasticizers, or "high end water reducers", are added to plastic concrete to reduce the water requirements of concrete. A quantity of 1.5 lbs. of a sulfonated naphthalene formaldehyde condensate, manufactured under the brand WRDA-19 ®, by W. R. Grace & Co.-Conn. is weighed.

The superplasticizer is manually packaged in a 14"×15" 50 lb. white multi-wall beater paper flat, pillow-type bag, of the type manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE VIII

Method of Using the Improved concrete Additive Products of the Present Invention The concrete additive product of ant previous Example is removed from the cardboard box. The bag is placed in a revolving drum-type rotating concrete mixer containing 1 $m^3$ of fresh ready mix concrete mixture through the drum opening. The fresh concrete and bag are mixed for 5 minutes. The admixture distribution is uniform.

EXAMPLE IX

Alternative Method of Using the Improved Concrete Additive Products of the Present Invention The concrete additive product of Example VIII is removed from the cardboard box. The bag is placed in a revolving drum-type rotating concrete mixer via an automated magazine feed dispenser which introduces the bag to the other concrete components at a rate of one bag per 1 m³ of concrete. Water is added to the dry mix and the fresh concrete slurry is mixed by rotating the drum for 5 minutes. The admixture distribution is uniform.

It is claimed:

1. A method for modifying the properties of concrete, comprising the steps of:
    placing one or more closed non-water-soluble paper packages into a fresh concrete, said packages containing a solid admixture including air-entraining admixtures, air detrainer admixture, accelerating admixture, alkali-reactivity reducer, superplasticizer, pumping aids, water-reducing admixture, corrosion inhibitor, permeability reducer, or mixtures thereof; and
    agitating the fresh concrete to cause the packaging material to disintegrate and distribute the admixture relatively uniformly throughout the fresh concrete.

2. The method of claim 1 wherein in said step of placing a non-water-soluble package into fresh concrete the paper is selected from the group consisting of repulpable and beater paper, shopping bag Kraft paper and multiwall Kraft paper.

3. The method of claim 2 wherein in said step of placing a non-water-soluble package into fresh concrete the paper is a repulpable, beater paper.

4. The method of claim 3 wherein in said step of placing a non-water-soluble package into fresh concrete the bag is sealed with a water soluble adhesive.

5. The method of claim 4 wherein in said step of placing a non-water-soluble package into fresh concrete the water soluble adhesive is a one-part acrylic copolymer emulsion adhesive.

6. The method of claim 5 wherein in said step of placing a non-water-soluble package into fresh concrete the number of packages is one per cubic meter of concrete.

7. The method of claim 3 wherein in said step of placing a non-water-soluble package into fresh concrete said paper has a basis weight of about 50 lbs., a machine direction tear of about 109, and a machine direction of about 16.

8. The method of claim 7 wherein in said step of placing a non-water-soluble package into fresh concrete said paper is fabricated from 100% pine pulp.

9. The method of claim 1 further comprising the step of providing a rotating batch cement into which said packages are placed.

10. A method for modifying the properties of concrete, comprising the steps of:
    placing one or more closed non-water-soluble paper packages into fresh concrete, said packages containing a solid admixture including an air-entraining admixture, an air-detrainer admixture, an accelerating admixture, an alkali-reactivity reducer, a superplasticizer, a pumping aid, a water-reducing admixture, a corrosion inhibitor, a permeability reducer, or combinations thereof; and
    agitating the fresh concrete to cause the non-water-soluble packaging material to disintegrate by fragmenting into pieces which are not detrimental to the concrete and to distribute the admixture relatively uniformly throughout the fresh concrete.

11. The method of claim 9 further comprising the step of providing a rotating batch cement mixer into which said non-water-soluble packages are placed.

* * * * *